United States Patent
Chung et al.

(10) Patent No.: US 7,113,248 B2
(45) Date of Patent: Sep. 26, 2006

(54) LIQUID CRYSTAL DISPLAY DEVICE AND METHOD OF MANUFACTURING THE SAME

(75) Inventors: Hyun-Sang Chung, Gyeonggi-do (KR); Young-Suk Park, Gyeonggi-do (KR)

(73) Assignee: LG. Philips LCD Co., LTD, Seoul (KR)

( * ) Notice: Subject to any disclaimer, the term of this patent is extended or adjusted under 35 U.S.C. 154(b) by 178 days.

(21) Appl. No.: 10/826,252

(22) Filed: Apr. 19, 2004

(65) Prior Publication Data

US 2004/0233375 A1 Nov. 25, 2004

(30) Foreign Application Priority Data

May 20, 2003 (KR) ............ 10-2003-0031808

(51) Int. Cl.
*G02F 1/1339* (2006.01)

(52) U.S. Cl. .............. 349/153; 349/110; 349/155; 349/187

(58) Field of Classification Search ............ 349/106, 349/110, 141, 153, 154, 155, 156, 187, 190
See application file for complete search history.

(56) References Cited

U.S. PATENT DOCUMENTS

| | | | |
|---|---|---|---|
| 6,384,882 B1 * | 5/2002 | Nagayama et al. | 349/110 |
| 6,414,733 B1 * | 7/2002 | Ishikawa et al. | 349/110 |
| 6,476,895 B1 | 11/2002 | Kwak et al. | |
| 2003/0090615 A1 * | 5/2003 | Park | 349/153 |

FOREIGN PATENT DOCUMENTS

KR 2001-0057024 A 7/2001

* cited by examiner

*Primary Examiner*—Toan Ton
*Assistant Examiner*—Tai Duong
(74) *Attorney, Agent, or Firm*—Birch, Stewart, Kolasch & Birch, LLP

(57) ABSTRACT

A liquid crystal display device includes first and second substrates spaced apart from each other, and a display region, a non-display region and a seal pattern region are defined thereon, a black matrix on an inner surface of the second substrate, a color filter layer on the black matrix in the display region and the seal pattern region, plurality of patterned spacers on the color filter layer in the display region, a patterned seal on the color filter layer in the seal pattern region, a seal pattern surrounding the patterned seal in the seal pattern region, and a liquid crystal layer disposed in the patterned seal between the first and second substrates.

24 Claims, 7 Drawing Sheets

LIQUID CRYSTAL DISPLAY DEVICE AND METHOD OF MANUFACTURING THE SAME

This application claims the benefit of Korean Patent Application No. 2003-31808, filed on May 20, 2003 in Korea, which is hereby fully incorporated by reference.

BACKGROUND OF THE INVENTION

1. Field of the Invention

The invention relates to a liquid crystal display (LCD) device having an improved seal pattern and a method of manufacturing the same.

2. Background of the Related Art

Liquid crystal display (LCD) devices are image display devices that utilize the ability of liquid crystal molecules to align according to an applied voltage. LCD devices generally include an upper substrate upon which a color filter is formed, a lower substrate upon which plurality of thin film transistors are formed, and a liquid crystal layer interposed between the upper and lower substrates. The LCD devices display images by controlling and changing the orientation of the liquid crystal molecules by applying voltage pulses to pixel and common electrodes.

A manufacturing process of the LCD devices includes a thin film transistor array process for forming the lower substrate, an upper substrate forming process, and a liquid crystal cell process. During the thin film transistor array process, a plurality of gate and data lines are formed on a substrate, and plurality of thin film transistors are formed at crossing portions of the gate and data lines. Then, a pixel electrode is formed in a pixel region of the lower substrate. During the upper substrate forming process, a color filter, a black matrix, and a common electrode are sequentially formed on the substrate. The liquid crystal cell process includes an alignment layer forming process, a rubbing process, a cleaning process subsequent to the rubbing process, an attachment process of the upper and lower substrates, and a liquid crystal material injection process. The aforementioned liquid crystal cell process will be described in greater detail hereinafter with reference to FIG. 1.

FIG. 1 shows a flow chart of a manufacturing process of an LCD device according to the related art.

Step ST1 includes the preparation of a first substrate, which has a thin film transistor and a pixel electrode, and a second substrate, which has a color filter layer and a common electrode.

Step ST2 includes the formation of first and second alignment layers on the pixel electrode and the common electrode, respectively. Step ST2 also includes coating a thin polymer film and rubbing the thin polymer film. The thin polymer film may be commonly referred to as an alignment layer. The thin polymer film must be uniformly formed, and the rubbing process must also be performed uniformly on the thin polymer film. The initial orientation of the liquid crystal molecules is determined by the rubbing. The liquid crystal molecules normally display a uniform picture due to the rubbing of the alignment layer. Polyimide is widely used as a material of the thin polymer film.

During step ST3, a seal pattern is formed on either the first substrate or the second substrate. The formation of the seal pattern includes forming a cell gap to allow for injection of liquid crystal material between the substrates. In addition, the seal pattern prevents the injected liquid crystal material from leaking outside the seal pattern. The seal pattern is commonly fabricated using a screen-printing method or a dispensing method of a mixing sealant formed from thermosetting resin and glass fiber.

During step ST4, spacers are sprayed on one of the first and second substrates to maintain a precise and uniform gap between the first and second substrates. The spacer spray method can be divided into two different types: a wet spray method that involves spraying a mixture of alcohol and spacer material and a dry spray method that involves spraying spacer material alone.

Here, the seal pattern and the spacers are formed on different substrates. For example, the seal pattern may be formed on the second substrate, which has a relatively even surface, and the spacers may be formed on the first substrate, which functions as a lower substrate of the liquid crystal display device.

During step ST5, the first and second substrates are aligned and then are attached to each other along the seal pattern. The alignment accuracy of the substrates is decided by a margin and an alignment accuracy of several micrometers is required because light leakage occurs if the substrates are misaligned beyond the margin.

During step ST6, the attached substrates are divided into unit cells. The cell cutting process includes a scribing process that forms cutting lines on a surface of the substrate using a diamond pen or a cutting wheel of tungsten carbide, the hardness of which is higher than the hardness of the glass substrate. A breaking process divides the unit cells by using force.

During step ST7, a liquid crystal material is injected between two substrates of the unit cells. Each unit cell has an area of several square centimeters and a gap of several micrometers. A vacuum injection method using the pressure difference between the inside and outside of the unit cells is commonly used as an effective injection method.

After finishing the liquid crystal material injection, the injection hole is sealed to prevent leakage of the liquid crystal material. Generally, an ultra violet (UV) curable resin is injected into the injection hole by use of a dispenser, and ultra violet light is then irradiated onto the resin to thereby harden the resin and seal the injection hole. Polarization films are attached on outer surfaces of the unit cell, and a driving circuit is connected to the unit cell using an attachment process.

FIGS. 2A and 2B show processes of forming a seal pattern according to the related art. FIG. 2A shows a seal pattern forming process using a screen-printing method, and FIG. 2B shows another seal pattern forming process using a dispensing method.

In FIG. 2A, a screen 12, which may include a pattern having a specific shape formed thereupon, and a squeegee 14, which may be used for scrubbing sealing material onto the screen 12, may be prepared to form a seal pattern. A seal pattern 16 may be formed on a substrate 10 by scrubbing the sealing material onto the screen 12 using the squeegee 14, for example. Accordingly, the seal pattern may include formation of a cell gap for subsequent injection of liquid crystal material to prevent the injected liquid crystal material from leaking out of the liquid crystal cell. The seal pattern 16 may be formed along edges of the substrate 10 and may include at least one injection hole 18 formed at one side thereof.

The seal pattern forming process may include at least two processes. The first process may include formation of the seal pattern 16 on the substrate 10 by scrubbing the sealing material onto the screen 12. The second process may include evaporating solvents contained in the sealing material to dry the sealing material.

Since the thickness of the seal pattern is closely associated with the cell gap of the liquid crystal display device, it is important to form a seal pattern having uniform thickness and height.

The screen-printing method is widely used due to its convenience, but it is difficult to use on a large substrate. Additionally, the dispensing method applies the sealing material onto the entire surface of the screen followed by scrubbing by the squeegee, and a large amount of sealing material may therefore be consumed.

To solve the above-mentioned problem, a dispensing method that can selectively form the seal pattern only at a desired region, has been gradually used. In FIG. 2B, an apparatus for the dispensing method may include a dispenser 24, a table 20, and a substrate 22 placed on the table 20. The method may use a syringe for dispensing the sealing material. For example, the seal pattern 26 can form by filling the sealing material into the dispenser 24, and then by dispensing the sealing material onto the substrate 22 by applying pressure to the syringe while moving the dispenser 24 or the table 20. Accordingly, a sealing material having a uniform width and thickness may be dispensed.

As described above, the seal pattern forms along edges of the substrate, and liquid crystal material is injected into the seal pattern through the injection hole of the seal pattern. Thus, the related art seal pattern directly contacts the liquid crystal material.

FIG. 3 shows a cross-sectional view of a liquid crystal display device according to the related art.

In FIG. 3, first and second substrates 30 and 50 are spaced apart from and face each other. A thin film transistor T, which is composed of a gate electrode 32, a semiconductor layer 34, a source electrode 36 and a drain electrode 38, is formed on an inner surface of the first substrate 30. A passivation layer 42 covers the thin film transistor T, and the passivation layer 42 has a drain contact hole 40 exposing a part of the drain electrode 38. A pixel electrode 44 is formed on the passivation layer 42, and the pixel electrode connects to the drain electrode 38 through the drain contact hole 40. A first alignment layer 46 is formed to cover the pixel electrode 44.

A black matrix 52 is formed on an inner surface of the second substrate 50 and corresponds to the thin film transistor T of the first substrate 30. A color filter layer 54 is formed on the black matrix 52. A common electrode 56 and a second alignment layer 58 are sequentially formed on the color filter layer 54.

The color filter layer 54, the common electrode 56 and the first and second alignment layers 46 and 58 are formed only in a display region A, which is defined as an area for displaying a picture. Although not shown in FIG. 3, the pixel electrode 44 and the common electrode 56 may extend into a non-display region C so as to electrically connect the substrates 30 and 50.

A seal pattern 60 is formed in the non-display region C outside the display region A to attach the substrates 30 and 50. A liquid crystal layer 70 is interposed in the seal pattern 60 between the substrates 30 and 50.

The seal pattern of the above structure according to the related art has many problems, some of which are discussed below.

First, the seal pattern directly contacts the liquid crystal layer, and impurities caused by the contact of the seal pattern and the liquid crystal layer inculcate into the liquid crystal panel to cause spots.

Second, the seal pattern is formed from an organic polymer material that adheres poorly to the substrate, and the seal pattern may break because of a lowered adhesion.

Third, the thickness difference between the spacer and the seal pattern may cause a non-uniform cell gap.

Fourth, if the seal pattern is formed by the dispensing method using a sealant mixed with glass fiber, then the life span of the dispenser shortens due to the glass fiber.

SUMMARY OF THE INVENTION

Accordingly, the invention is directed to a liquid crystal display (LCD) device including a seal pattern and a method of manufacturing the same that substantially obviates one or more of problems due to limitations and disadvantages of the related art.

An object of the invention is to provide a liquid crystal display device including a seal pattern that prevents spots and breakdown and a method of manufacturing the same.

Another object of the invention is to provide a liquid crystal display device including a seal pattern that has an improved adhesion to a substrate and a method of manufacturing the same.

The invention, in part, pertains to a liquid crystal display device that includes first and second substrates spaced apart from each other, wherein a display region, a non-display region and a seal pattern region are defined thereon, a black matrix over an inner surface of the second substrate, a color filter layer over the black matrix in the display region and the seal pattern region, a plurality of patterned spacers over the color filter layer in the display region, a patterned seal over the color filter layer in the seal pattern region, a seal pattern surrounding the patterned seal in the seal pattern region, and a liquid crystal layer disposed in the patterned seal between the first and second substrates.

In the invention, the device can further comprise an array element layer over an inner surface of the first substrate, wherein the array element layer includes a pixel electrode and a common electrode. The color filter layer and the patterned seal have first and second holes that correspond to each other, wherein the seal pattern is formed in the first and second holes. Also, the first and second holes can be formed in the seal pattern region. The patterned seal can include a plurality of openings at an outer portion thereof, wherein a plurality of openings are connected to the second hole. Further, the thickness of the liquid crystal layer can be defined as a cell gap, and the cell gap can be determined by the thickness of the patterned spacers and the patterned seal.

The invention, in part, pertains to a method of manufacturing a liquid crystal display includes forming a color filter layer over a first substrate, on which a display region, a non-display region, and a seal pattern region are defined, wherein the color filter layer is disposed in the display region and the seal pattern region, forming a plurality of patterned spacers in the display region and a patterned seal in the seal pattern region by forming a first insulating material over the color filter layer and patterning the first insulating material through a photolithographic process, forming a seal pattern outside the patterned seal, wherein the seal pattern has a same thickness as the patterned seal, attaching the first substrate including the seal pattern with a second substrate, and injecting a liquid crystal material in the patterned seal between the first and second substrates.

In the invention, the method can include forming a black matrix before forming the color filter layer, the black matrix being disposed between colors of the color filter. The black matrix can be formed in the seal pattern region, and the black matrix in the seal pattern region can be exposed. The method can also form the color filter including forming a first hole, forming the patterned seal can include forming a second hole corresponding to the first hole, and the seal pattern can be formed in the first and second holes. Also, forming the seal pattern can use one of a screen-printing method and a dispensing method.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Advantages of the present invention will become more apparent from the detailed description given herein after. However, it should be understood that the detailed description and specific examples, while indicating preferred embodiments of the invention, are given by way of illustration only, since various changes and modifications within the spirit and scope of the invention will become apparent to those skilled in the art from this detailed description.

Reference will now be made in detail to embodiments of the invention, examples of which are illustrated in the accompanying drawings.

Figure 1:
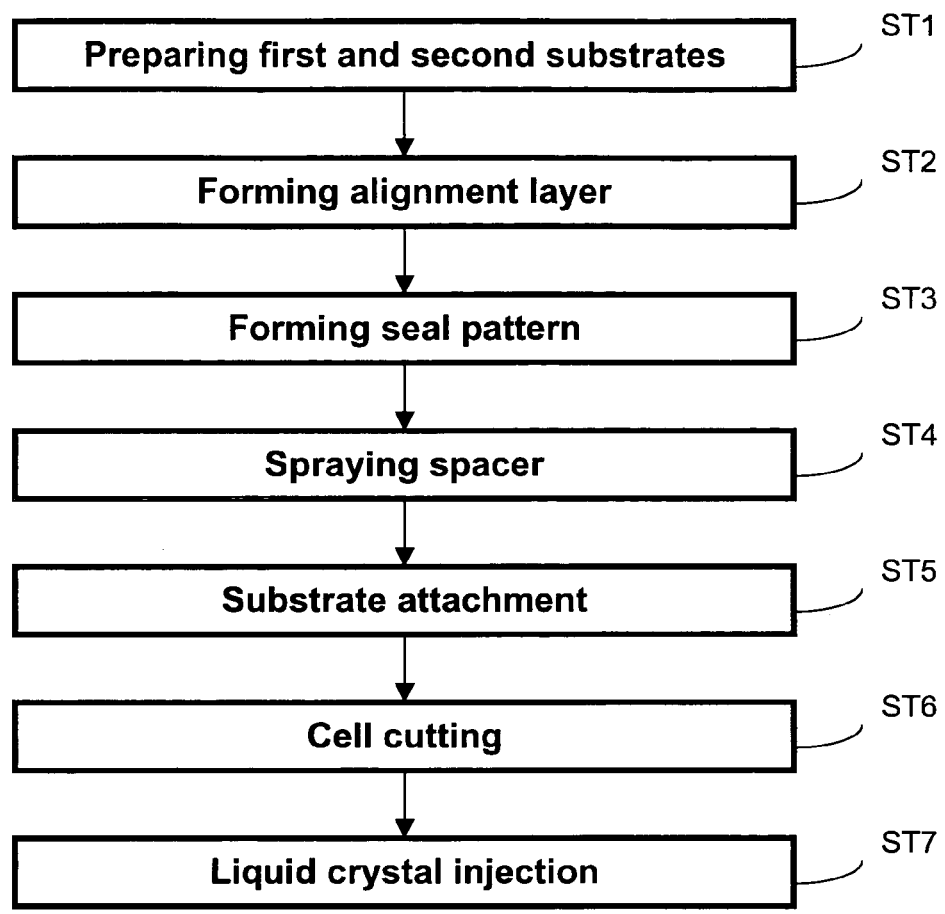
FIG. 1 is a flow chart showing a manufacturing process of an LCD device according to the related art.
Figure 2A:
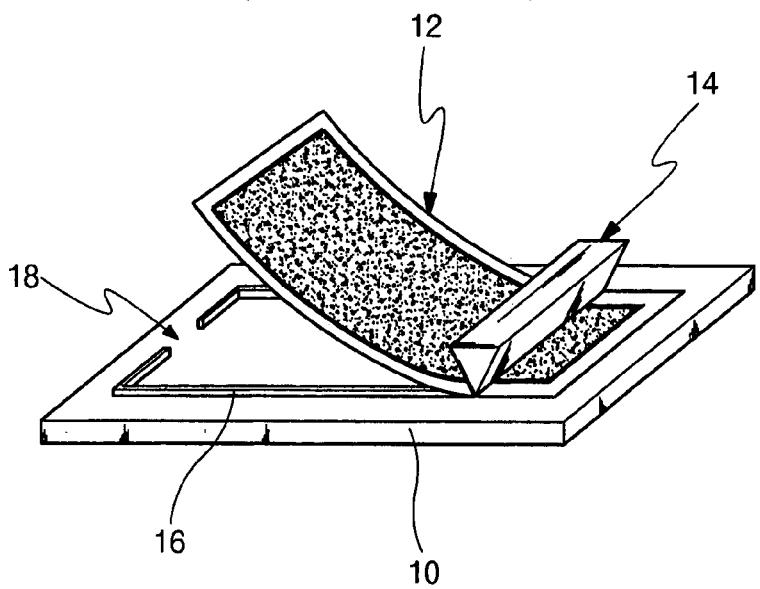
FIGS. 2A and 2B show processes of forming a seal pattern in the related art.
Figure 2B:
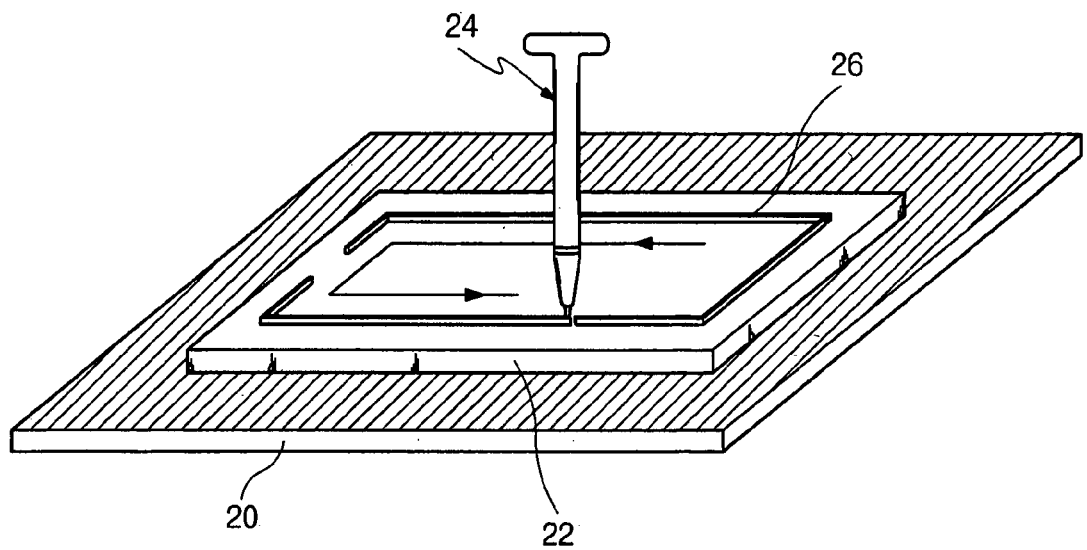
Figure 3:
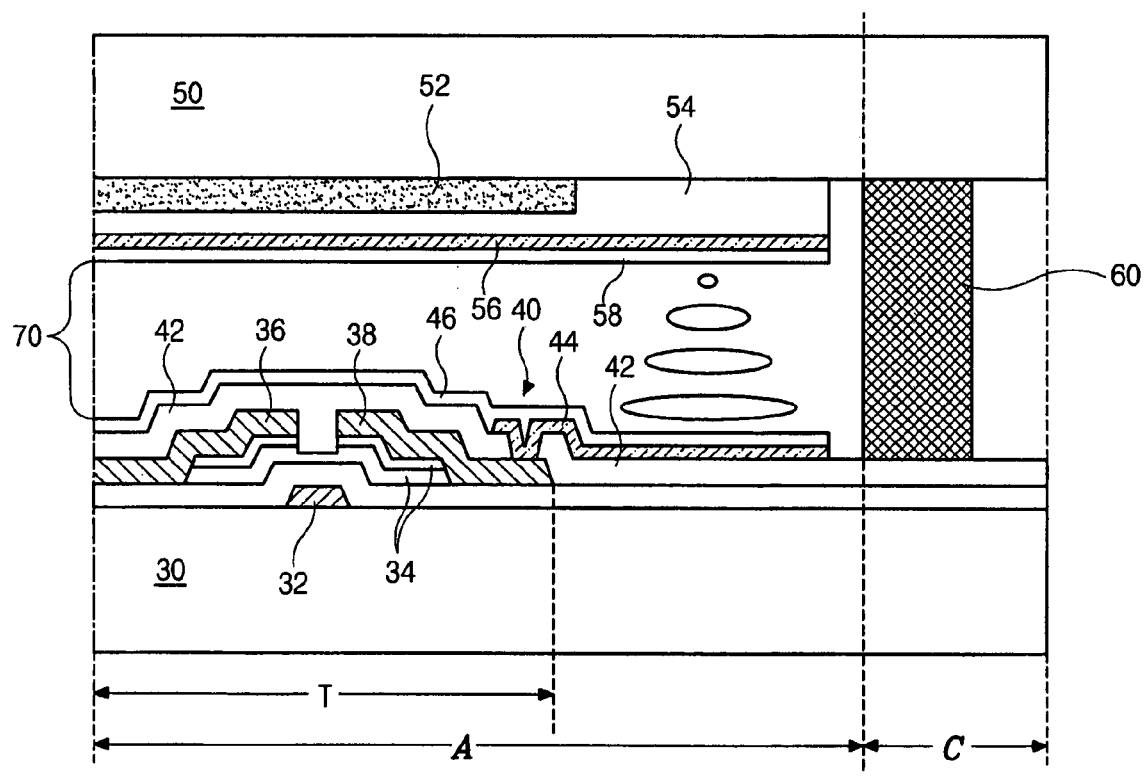
FIG. 3 is a cross-sectional view of a liquid crystal display device according to the related art.
Figure 4:
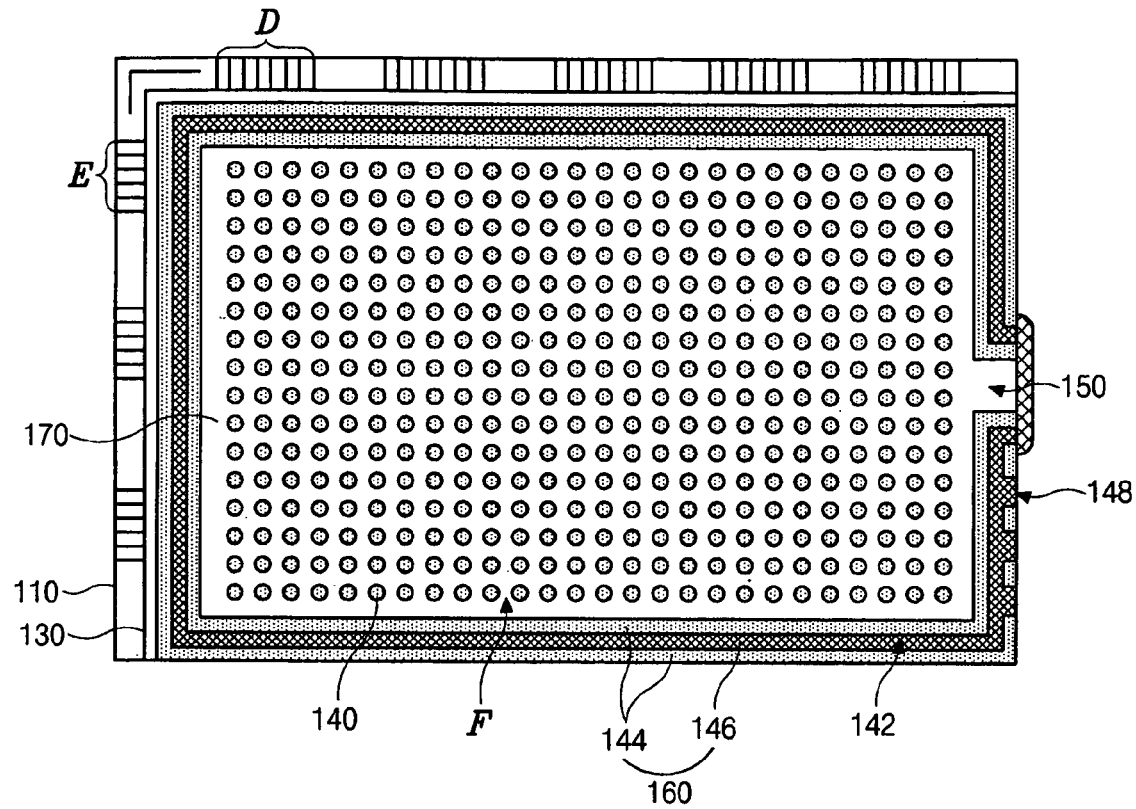
FIG. 4 is a schematic plan view of a liquid crystal display device according to the invention.

FIG. 4 shows a schematic plan view of a liquid crystal display device according to the invention.

FIG. 4 shows a first substrate 110 and a second substrate 130 arranged to overlap each other. The first substrate 110 has pad portions D and E, which are exposed by the second substrate 130. A seal pattern set 160 is disposed at an edge area between the first and second substrate 110 and 130. The seal pattern set 160 has a side with a liquid crystal injection hole 150. An area inside the seal pattern set 160 is defined as a display region F, in which plurality of patterned spacers 140 are spaced apart from each other and a liquid crystal layer 170 is disposed. Although the spacers 140 are shown to be round, they can have any suitable shape, such as oblongs, squares, triangles or ovals.

The seal pattern set 160 is formed of the same material as the patterned spacers 140. The seal pattern set 160 is composed of a patterned seal 144 having a hole 142 therein and a seal pattern 146 formed in the hole 142. In order to easily exhaust fumes formed during the curing process, a plurality of openings 148 are formed at a side of the patterned seal 144 to be connected to the hole 142. The openings 148 may be omitted. Also, the openings 148 can have any suitable shape such as circles, oblongs, squares, triangles or ovals.

Figure 5:
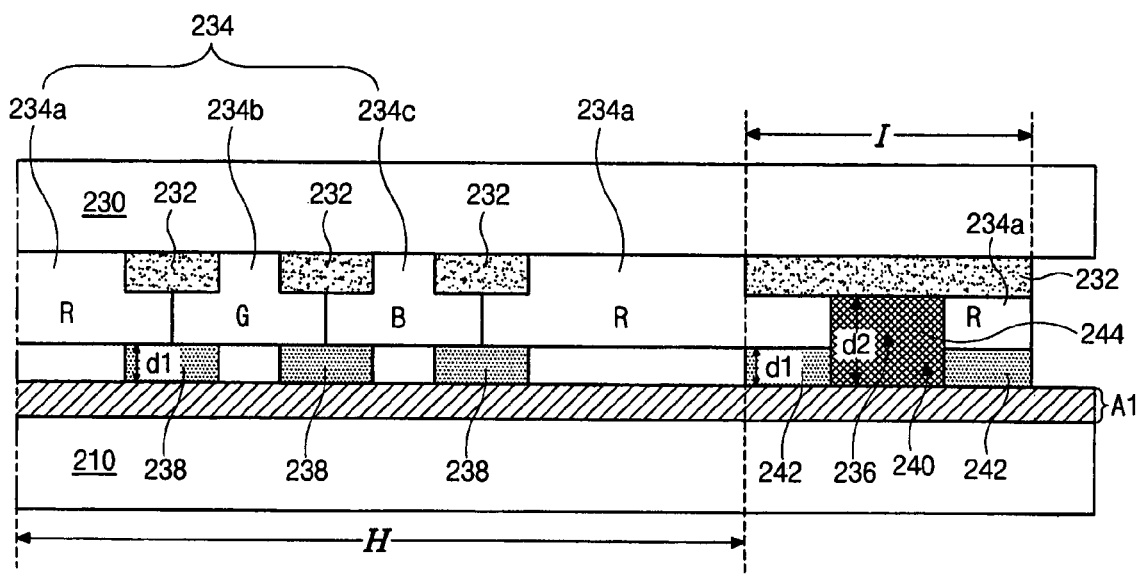
FIG. 5 is a cross-sectional view of a liquid crystal display device according to a first embodiment of the invention.

FIG. 5 shows a cross-sectional view of a liquid crystal display device according to a first embodiment of the invention. The liquid crystal display device may have an in-plane switching mode, in which a pixel electrode and a common electrode are formed on the same substrate.

FIG. 5 shows an array element layer A1 being formed over an inner surface of a first substrate 210, and a black matrix 232 is formed over an inner surface of a second substrate 230. The black matrix 232 is disposed in a boundary between colors (R, G and B) and a seal pattern region I between a display region and a non-display region. The black matrix 232 in the seal pattern region I blocks light leakage around the seal pattern, and the black matrix 232 in the seal pattern region I may be removed. A color filter layer 234 is formed over the black matrix 232. The color filter layer 234 is composed of red, green and blue sub-color filters 234a, 234b and 234c, which are sequentially arranged. The color filter layer 234, for example, the red sub-color filter 234a, may extend into the seal pattern region I, and the color filter layer 234 has a first hole 236. Patterned spacers 238 are formed in the display region H to correspond to the black matrix 232. A patterned seal 242 is formed in the seal pattern region I, and has a second hole 240 located over and corresponding to the first hole 236.

Although not shown in detail, the array element layer A1 may include a thin film transistor as a switching element, a pixel electrode connected to the thin film transistor, and a common electrode arranged parallel with the pixel electrode.

The patterned spacers 238 and the patterned seal 242 are formed of the same material through the same process, for example, a photolithographic process using an organic material, and have the same thickness d1. A seal pattern 244 is formed in the first hole 236 and the second hole 240.

The seal pattern 244 may have a width similar to that of the related art. A thickness d2 of the seal pattern 244 may be determined by the thickness of the patterned seal 242.

Figure 6:
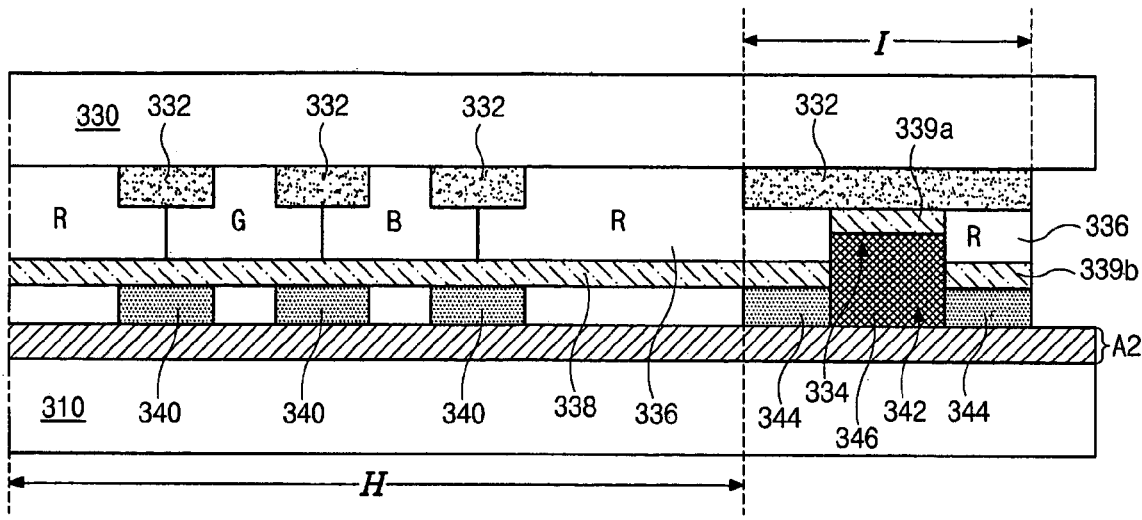
FIG. 6 is a cross-sectional view of a liquid crystal display device according to a second embodiment of the invention.

FIG. 6 shows a cross-sectional view of a liquid crystal display device according to a second embodiment of the invention. In this embodiment, a common electrode is formed on the same substrate as a color filter layer similarly to a twisted nematic (TN) mode liquid crystal display device. FIG. 6 omits explanations of the same parts as shown in the first embodiment of FIG. 5.

FIG. 6 shows a black matrix 332 being formed over an inner surface of a second substrate 330, and a color filter layer 336 is formed over the black matrix 332. The color filter layer 336 extends to a seal pattern region I, and the color filter layer 336 has a first hole 334 in the seal pattern region I. A common electrode 338 is formed over the second substrate 330 including the color filter layer 336 and the first hole 334. First and second conductive material layers 339a and 339b, have an island shape and are made of the same material as the common electrode 338, and are formed in the first hole 334 and on the color filter layer 336 outside the first hole 334, respectively.

Patterned spacers 340 are formed over the common electrode 338 in the display region H, and a patterned seal 344 is formed over the common electrode 338 and the second conductive material layer 339b in the seal pattern region I. The patterned seal 344 has a second hole 342 corresponding to the first hole 334.

An array element layer A2 is formed over an inner surface of the first substrate 310. The array element layer A2 includes a thin film transistor and a pixel electrode.

In the first and second embodiments, the patterned seal prevents the seal pattern from contacting the liquid crystal layer, and the color filter layer is extended to the seal pattern region. Thus, the distance between the patterned spacers and the patterned seal is compensated, thereby keeping the cell gap uniform. In addition, the adhesion characteristics of the seal pattern are improved because holes are formed in the color filter layer and the patterned seal, in which the seal pattern is formed.

FIGS. 7A to 7F are cross-sectional views showing a manufacturing process of the liquid crystal display device according to the second embodiment of the invention.

Figure 7A:
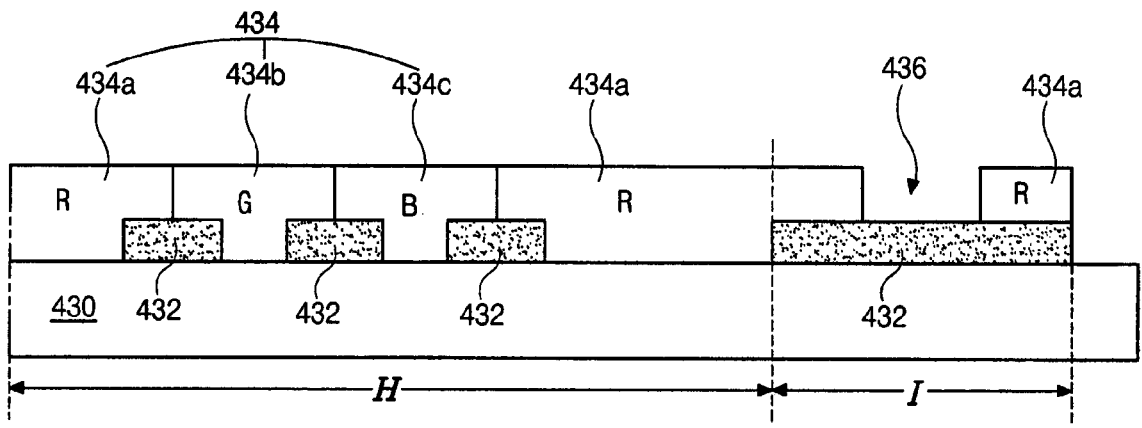
FIGS. 7A to 7F are cross-sectional views showing manufacturing processes of the liquid crystal display device according to the second embodiment.

FIG. 7A shows a black matrix 432 being formed over a substrate 430, and a color filter layer 434 is formed over the black matrix 432. The color filter layer 434 includes red, green and blue sub-color filters, which are sequentially arranged. A part of the color filter layer 434, for example, the red sub-color filter 434a, extends to a seal pattern region I, and has a first hole 436. The first hole 436 exposes the black matrix 432. In this embodiment, the color filter layer 434 is extended to the seal pattern region I in order to make a cell gap uniform. The color filter layer 434 in the seal pattern region I functions as a pattern for compensating a step rather than realizing colors. The black matrix 432 is disposed in a boundary between the colors and in the seal pattern region I.

Although not shown in FIG. 7A, an overcoat layer may be formed over the color filter layer 434.

Figure 7B:
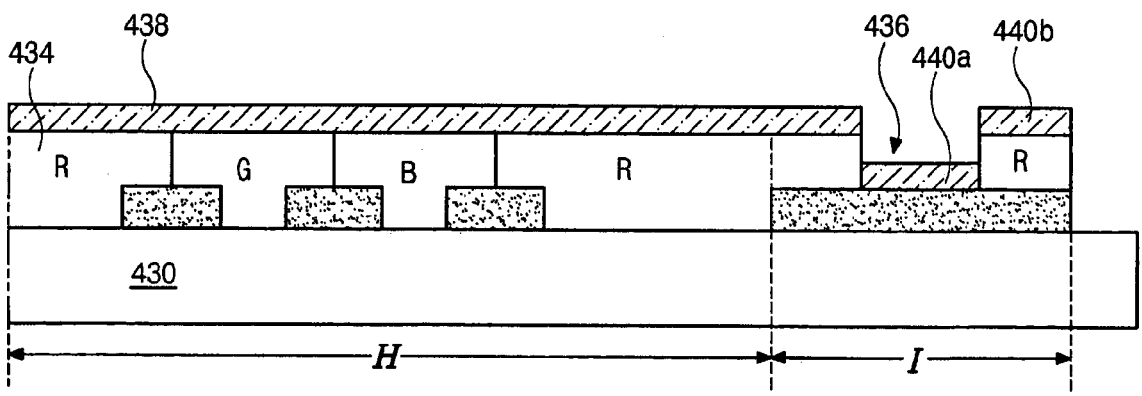

FIG. 7B shows a common electrode 438 being formed over the color filter layer 434. The common electrode 438 may be made of a transparent conductive material such as ITO (indium tin oxide) or IZO (indium zinc oxide). The common electrode 438 is formed over an entire surface of the substrate 430 without an additional patterning process, and first and second conductive material layers 440a and 440b are formed over the first hole 436 and on the color filter layer 434a outside the first hole 436, respectively. The first and second island-shaped conductive material layers 440a and 440b may be removed if the common electrode 438 is selectively formed in the display region H.

Figure 7C:
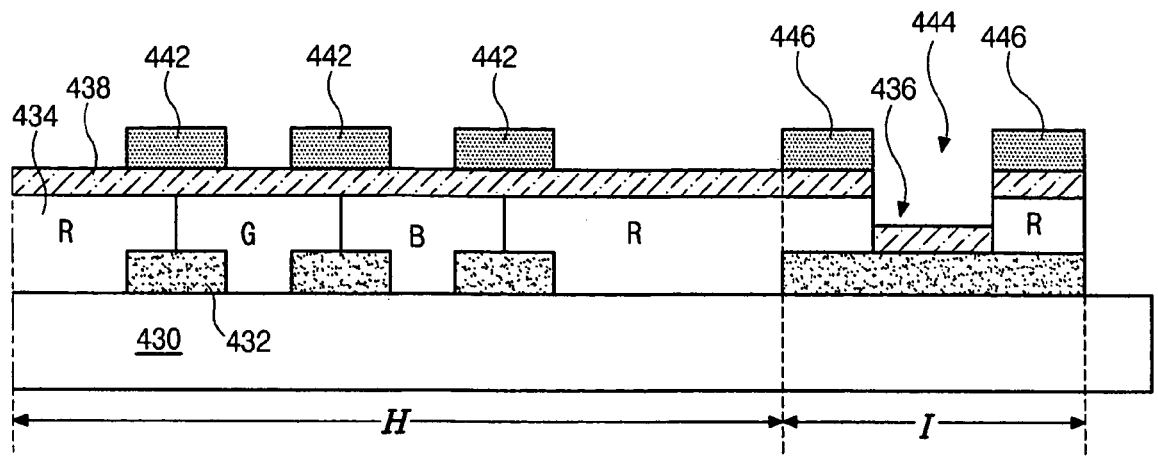

FIG. 7C shows patterned spacers 442 being formed over the common electrode 438 in the display region H, and a patterned seal 446 is formed on the common electrode 438 and on the second conductive material layer 440b in the seal pattern region I. The patterned spacers 442 correspond to the black matrix 432, and the patterned seal 446 has a second hole 444 located over and corresponding to the first hole 436.

Figure 7D:
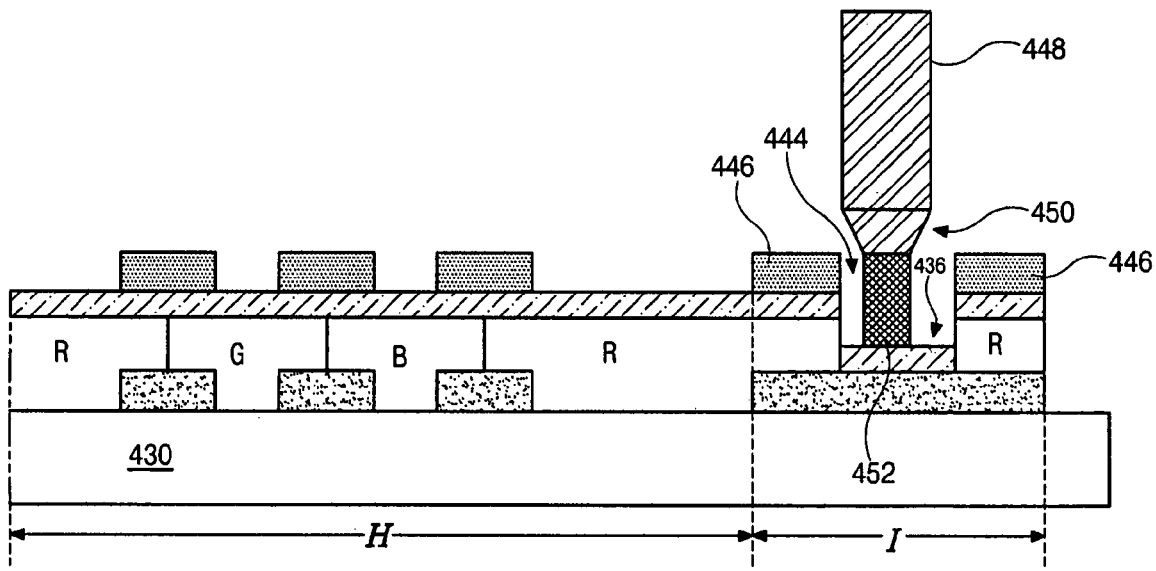

FIG. 7D shows a sealant 452 being placed in the first and second holes 436 and 444 using a dispensing method. The sealant 452 is injected though a nozzle 450, which is a head part of a dispenser 448. In this embodiment, since the patterned seal 446 acts as a supporter in the seal pattern region I, glass fiber that has been added to the sealant may be omitted. Thus, a blending process of the sealant and the glass fiber can be omitted to thereby prevent bubbles and other irregularities. Additionally, the lifetime of the nozzle for dispensing the sealant can be lengthened.

Figure 7E:
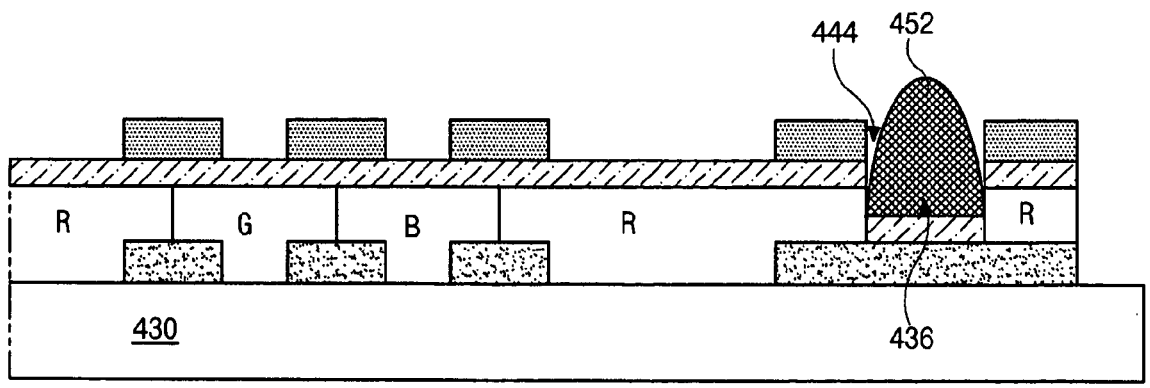

FIG. 7E shows the sealant 452 being disposed in the first and second hole 436 and 444. The sealant 452 protrudes over the patterned seal 446.

Figure 7F:
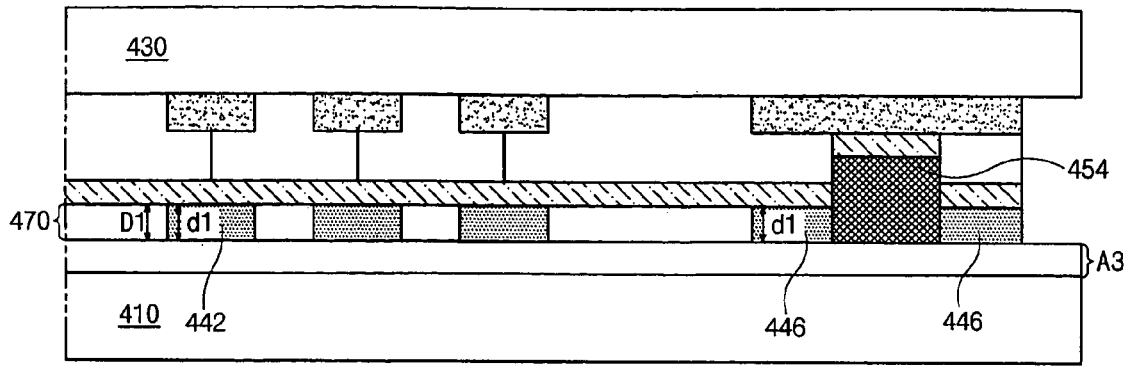

FIG. 7F shows the substrate 430, including the sealant 452, being aligned with another substrate 410 that includes an array element layer A3 attached to the substrate 410 through a curing the sealant 452 of FIG. 7E. The substrate 410 appears disposed under the substrate 430 in the context of the FIG. 7F, and the array element layer A3 faces the common electrode 438. Then, a liquid crystal layer 470 is interposed between the substrates 410 and 430, and an end sealing process is performed. The cured sealant forms a seal pattern 454.

Although not shown in the figures, the patterned seal 446 may have an opening in order to exhaust fumes formed during the curing process of the seal pattern 454.

The inventive seal pattern 454 fills the hole of the patterned seal 446. Therefore, a cell gap D1, which may be defined as a thickness of the liquid crystal layer 470, is determined by the thickness d1 of the patterned spacers 442 and the patterned seal 446. Since the patterned spacers 442 and the patterned seal 446 are formed using the same material through the same process to have the same thickness d1, the step, i.e., distance, between the spacer and the seal pattern can be compensated, thereby effectively improving the uniformity of the cell gap.

The patterned seal 446 is formed inside and outside the seal pattern 454, and thus impurities or moisture are prevented from inculcating into the panel.

FIGS. 8 to 11 show cross-sectional views of a color filter substrate for a liquid crystal display device including seal pattern sets according to third, fourth, fifth and sixth embodiments of the invention, respectively. The common electrode is omitted in these figures.

Figure 8:
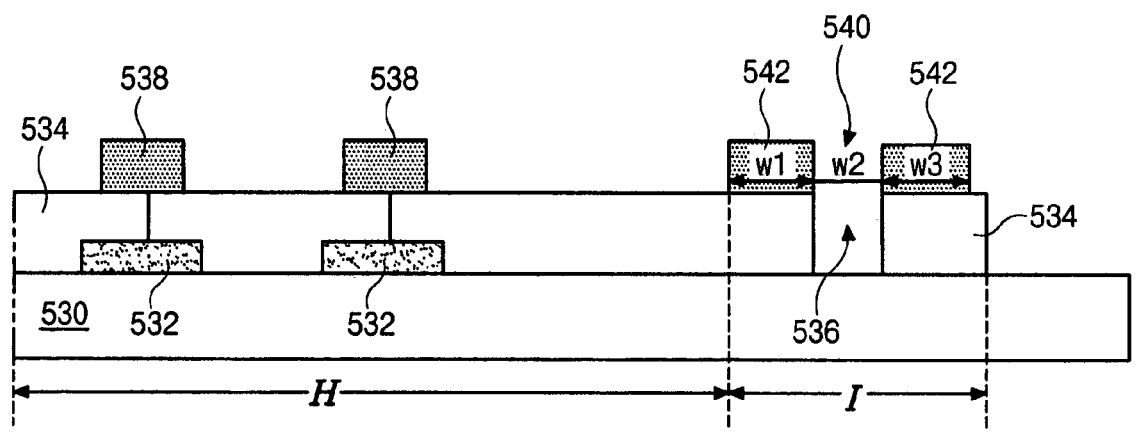
FIG. 8 shows a cross-sectional view of a color filter substrate for a liquid crystal display device including seal pattern sets according to a third embodiment of the invention.

FIG. 8 shows a black matrix 532 and a color filter layer 534 that are sequentially formed on a substrate 530, and which may be referred to as a color filter substrate. The black matrix 532 is formed only in a display region H.

The color filter layer 534 extends into a seal pattern region I, and has a first hole 536 in the seal pattern region I. Patterned spacers 538 are formed on the color filter layer 534 corresponding to the black matrix 532. A patterned seal 542 is formed in the seal pattern region I, and has a second hole 540 located over and corresponding to the first hole 536.

In the context of FIG. 8, a left portion width of the patterned seal 542, a hole width (that is, a seal pattern width), and a right portion width of the patterned seal 542 are designated as w1, w2, and w3, respectively. For example, w1 may be within a range of about 1.0 mm to about 1.5 mm, w2 may be within a range of about 0.1 mm to about 0.3 mm, and w3 may be within a range of about 1.0 mm to about 1.5 mm. Other ranges can be used. That is, w1 may be within a range of about 0.8 mm to about 1.7 mm, w2 may be within a range of about 0.05 mm to about 0.5 mm, and w3 may be within a range of about 0.8 mm to about 1.7 mm.

Figure 9:
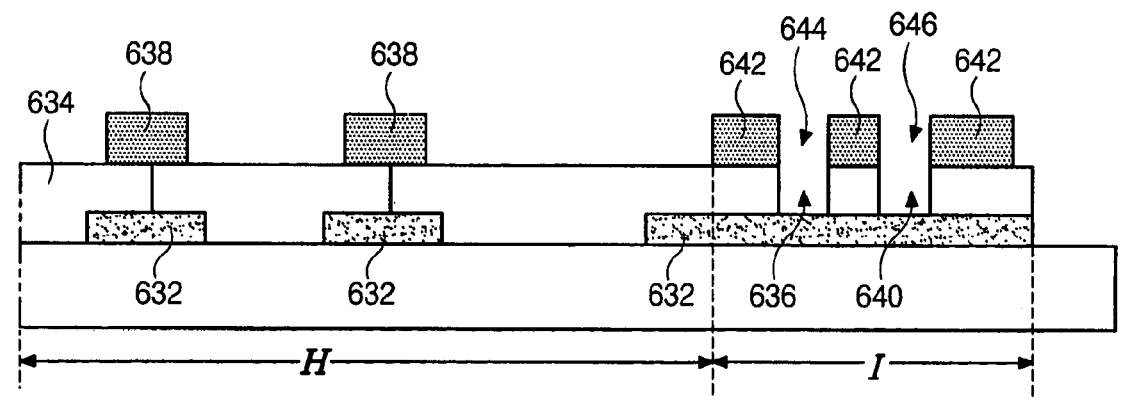
FIG. 9 shows a cross-sectional view of a color filter substrate for a liquid crystal display device including seal pattern sets according to a fourth embodiment of the invention.

FIG. 9 shows a black matrix 632 being formed even in a seal pattern region I. A color filter layer 634 extends to the seal pattern region I. In the seal pattern region I, the color filter layer 634 has first and second holes 636 and 640, which expose the black matrix 632 and are spaced apart.

Patterned spacers 638 are formed over the color filter layer 634 corresponding to the black matrix 632. A patterned seal 642 is formed in the seal pattern region I, and has third and fourth holes 644 and 646, which correspond to the first and second holes 636 and 640, respectively.

In the fourth embodiment, since the patterned seal 642 includes two holes, the adhesive properties between the patterned seal 642 and the sealant (not shown) may improve.

Figure 10:
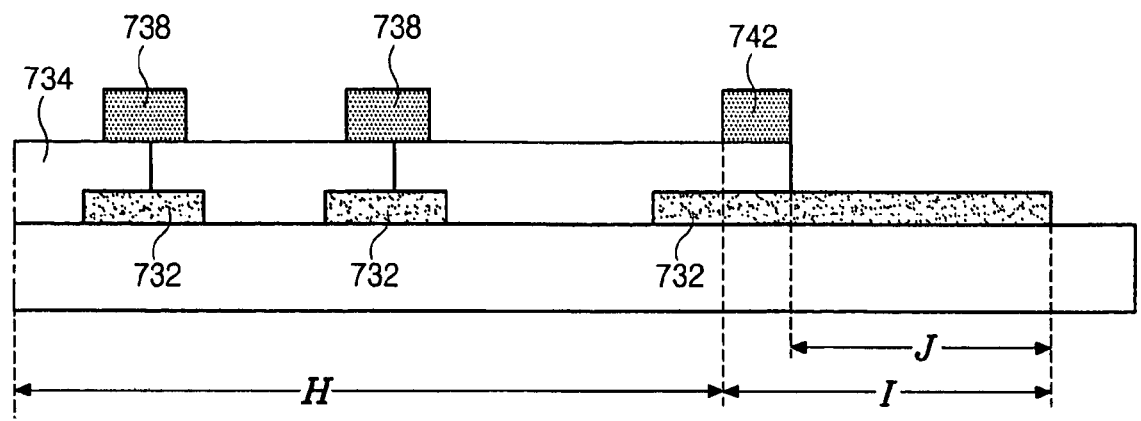
FIG. 10 shows a cross-sectional view of a color filter substrate for a liquid crystal display device including seal pattern sets according to a fifth embodiment of the invention.

FIG. 10 shows a black matrix 732 that forms in the seal pattern region I. A color filter layer 734 is formed in the seal pattern region I and is removed in a seal-pattern forming-portion J to expose the black matrix 732. Patterned spacers 738 are formed over the color filter layer 734 corresponding to the black matrix 732. A patterned seal 742 is formed in the seal pattern region I, and the patterned seal 742 does not include a hole. The patterned seal 742 may have a wall shape for preventing a seal pattern, which may be formed in the seal pattern-forming portion J later, from contacting a liquid crystal layer, which may be disposed in a display region H.

Figure 11:
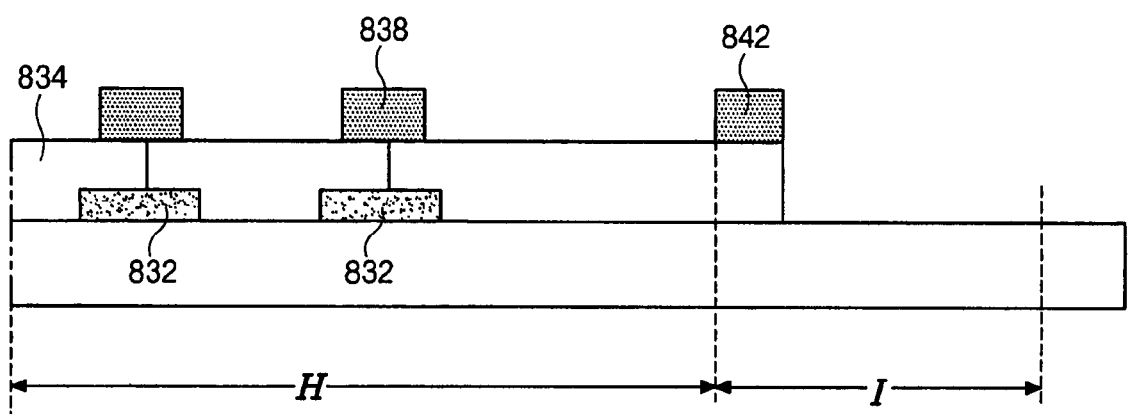
FIG. 11 shows a cross-sectional view of a color filter substrate for a liquid crystal display device including seal pattern sets according to a sixth embodiment of the invention.

FIG. 11 shows the color filter layer 834 and the patterned seal 842 having the same structures as those of FIG. 10. The black matrix 832 is removed in the seal pattern region I.

The patterned seals 742 and 842 of FIGS. 10 and 11 effectively exhaust fumes formed during a curing process of the seal pattern.

The liquid crystal display device including the seal pattern set according to the invention has the following effects.

First, the patterned seal prevents the seal pattern from contacting the liquid crystal layer, and seal spots may be prevented.

Second, since the color filter layer extends to the seal pattern region and the patterned seal is formed through the same process as the patterned spacer, the stepping between the spacer and the seal pattern may be prevented, whereby uniformity of the cell gap may be improved.

Third, a hole is formed in the color filter layer of the seal pattern region, and the seal pattern is formed in the hole. Thus, improving the contact adhesion of the seal pattern may prevent breakdown of the seal pattern.

Fourth, inculcation of moisture from the outside may be effectively blocked due to the patterned seal, wherein the seal pattern is formed in a hole thereof.

Fifth, because the patterned seal acts as a support, the glass fiber added to the sealant may be omitted. Therefore, bubbles formed during the blending process of the glass fiber may be prevented and the life span of the nozzle of the dispenser may be extended.

It will be apparent to those skilled in the art that various modifications and variations can be made in the fabrication and application of the invention without departing from the spirit or scope of the invention. Thus, it is intended that the invention cover the modifications and variations of this invention provided they come within the scope of the appended claims and their equivalents.

What is claimed is:

1. A liquid crystal display device, comprising:
a first substrate and a second substrate spaced apart from each other, and a display region, a non-display region and a seal pattern region are defined on the substrates;
a black matrix over an inner surface of the second substrate;
a color filter layer over the black matrix in the display region and the seal pattern region;
a plurality of patterned spacers over the color filter layer in the display region;
a patterned seal over the color filter layer in the seal pattern region;
a seal pattern surrounded by the patterned seal in the seal pattern region; and
a liquid crystal layer disposed inside the patterned seal.

2. The device according to claim 1, wherein the black matrix is further formed in the seal pattern region.

3. The device according to claim 1, wherein the patterned seal is formed of a same material as the patterned spacers.

4. The device according to claim 1, wherein the patterned seal is formed through a same process as the patterned spacers.

5. The device according to claim 1, wherein the patterned spacers and the patterned seal have a same thickness.

6. The device according to claim 1, wherein the patterned spacers are formed to correspond to the black matrix.

7. The device according to claim 1, further comprising a common electrode between the patterned spacers and the color filter layer and between the patterned seal and the color filter layer.

8. The device according to claim 1, further comprising an array element layer over an inner surface of the first substrate, wherein the array element layer includes a pixel electrode.

9. The device according to claim 1, further comprising an array element layer over an inner surface of the first substrate, wherein the array element layer includes a pixel electrode and a common electrode.

10. A liquid crystal display device, comprising:
a first substrate and a second substrate spaced apart from each other, and a display region, a non-display region and a seal pattern region are defined on the substrates;
a black matrix over an inner surface of the second substrate;
a color filter layer over the black matrix in the display region and the seal pattern region;
a plurality of patterned spacers over the color filter layer in the display region;
a patterned seal over the color filter layer in the seal pattern region;
a seal pattern surrounded by the patterned seal in the seal pattern region; and
a liquid crystal layer disposed inside the patterned seal, wherein the color filter layer and the patterned seal have first and second holes which correspond to each other, wherein the seal pattern is formed in the first and second holes.

11. The device according to claim 10, wherein the first and second holes are formed in the seal pattern region.

12. The device according to claim 10, wherein the patterned seal includes a plurality of openings at an outer portion thereof, wherein the plurality of openings are connected to the second hole.

13. The device according to claim 10, wherein a left portion of the patterned seal has a width of about 1.0 to 1.5 mm, the second hole has a width of about 0.1 to 0.3 mm, and a right portion of the patterned seal has a width of about 1.0 mm to 1.5 mm.

14. The device according to claim 1, wherein a thickness of the liquid crystal layer is defined as a cell gap, and the cell gap is determined by thicknesses of the patterned spacers and the patterned seal.

15. The device according to claim 1, wherein the seal pattern has a greater thickness than the patterned seal.

16. The device according to claim 1, wherein the seal pattern and patterned seal contact each other to form a seal pattern set.

17. A method of manufacturing a liquid crystal display, comprising:
forming a color filter layer on a first substrate, on which a display region, a non-display region, and a seal pattern region are defined, the color filter layer being disposed in the display region and the seal pattern region;
forming a plurality of patterned spacers in the display region and a patterned seal in the seal pattern region by forming a first insulating material on the color filter layer and patterning the first insulating material through a photolithographic process, the patterned spacers having a same thickness as the patterned seal;

forming a seal pattern surrounded by the patterned seal;

attaching the first substrate including the seal pattern with a second substrate; and injecting a liquid crystal material inside the patterned seal between the first and second substrates.

18. The method according to claim 17, further comprising:

forming a black matrix before forming the color filter layer, the black matrix being disposed between colors of the color filter.

19. The method according to claim 18, wherein the black matrix is formed in the seal pattern region.

20. The method according to claim 19, wherein the black matrix in the seal pattern region is exposed.

21. The method according to claim 17, wherein forming the color filter includes forming a first hole, and forming the patterned seal includes forming a second hole corresponding to the first hole, and the seal pattern is formed in the first and second holes.

22. The method according to claim 17, wherein forming the seal pattern uses one of a screen-printing method and a dispensing method.

23. The method according to claim 17, wherein the seal pattern has a greater thickness than the patterned seal.

24. The method according to claim 17, wherein the seal pattern and patterned seal contact each other to form a seal pattern set.

* * * * *